(12) United States Patent
Chang

(10) Patent No.: US 8,027,580 B2
(45) Date of Patent: Sep. 27, 2011

(54) IMAGE CAPTURE UNIT AND IMAGE CAPTURE DEVICE HAVING SAME

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/844,807

(22) Filed: Jul. 27, 2010

(65) Prior Publication Data

US 2011/0076000 A1 Mar. 31, 2011

(30) Foreign Application Priority Data

Sep. 30, 2009 (CN) .............................. 200910308009

(51) Int. Cl.
*G03B 17/00* (2006.01)
(52) U.S. Cl. .......................................... 396/75; 362/606
(58) Field of Classification Search .................... 396/75; 362/606
See application file for complete search history.

(56) References Cited

U.S. PATENT DOCUMENTS

| | | | | |
|---|---|---|---|---|
| 2003/0095400 | A1* | 5/2003 | Kashima et al. | 362/31 |
| 2007/0206114 | A1* | 9/2007 | Tanaka et al. | 348/371 |
| 2009/0040787 | A1* | 2/2009 | Nagata et al. | 362/619 |
| 2009/0092366 | A1* | 4/2009 | Iwasaki | 385/129 |

* cited by examiner

*Primary Examiner* — W. B. Perkey
*Assistant Examiner* — Linda B Smith
(74) *Attorney, Agent, or Firm* — Altis Law Group, Inc.

(57) ABSTRACT

An exemplary image capture unit includes a light guide plate, a camera module, and a driving unit. The light guide plate includes a first wedge-shaped portion, a second wedge-shaped portion, and an intermediate portion connecting to the first wedge-shaped portion and the second wedge-shaped portion. The intermediate portion has a uniform thickness. The camera module faces the light guide plate. The camera module has an optical axis associated therewith. The driving unit is configured for driving the light guide plate to move relative to the camera module to selectively align the camera module with the first wedge-shaped portion, the second wedge-shaped portion, or the intermediate portion.

13 Claims, 12 Drawing Sheets

IMAGE CAPTURE UNIT AND IMAGE CAPTURE DEVICE HAVING SAME

BACKGROUND

1. Technical Field

The present disclosure relates to image capture units and image capture devices having the same.

2. Description of the Related Art

Panoramic image technology for portable image capture devices is used to archive continuous images into a panoramic image. In general, a user intends to capture such a view, but the image capture device doesn't have a wide enough angle lens and cannot capture all of the view in one image. Hence, the user must take several images, sequentially moving the portable image capturing device to several fields of vision manually, and then use software to stitch all the images into a panoramic image. The manual method of the user moving appropriate distances, estimated by sight, to adjust the position of the image capture device for additional images may not always be accurate and the user may not have the software or knowledge to stitch the separate images into a desired panoramic image. Hence, having a portable image capture device with a wide-angle lens to acquire the panoramic image is an expensive option for acquiring panoramic images.

Therefore, it is desirable to provide an image capture unit and an image capture device which can overcome the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present image capture unit and image capture device. Moreover, in the drawings, like reference numerals designate corresponding parts throughout the views.

DETAILED DESCRIPTION

Embodiments of the image capture device and the image capture unit are described in detail here with reference to the drawings.

Figure 1:
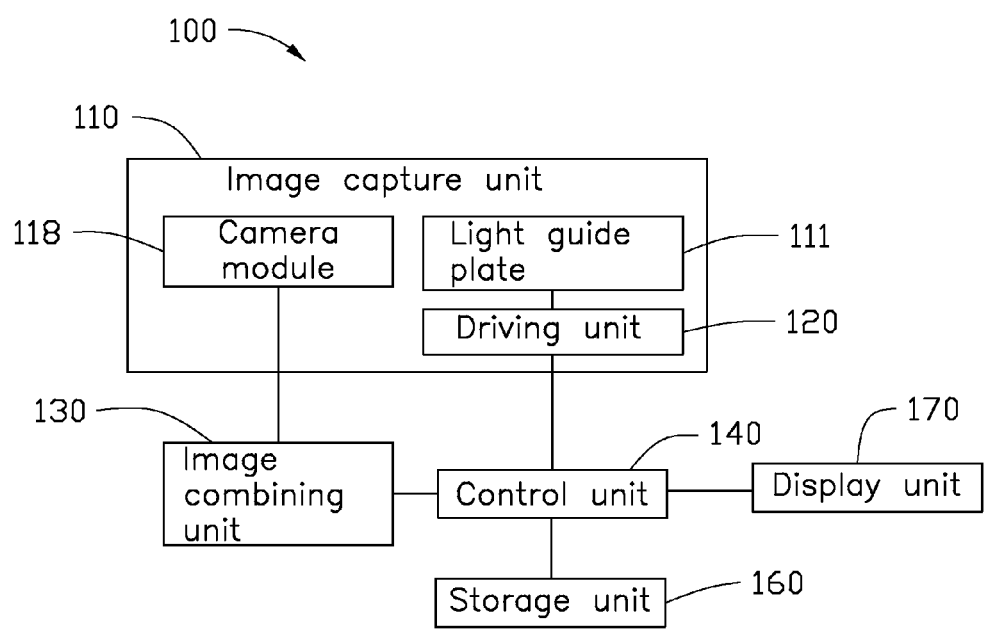
FIG. 1 is a functional block diagram of an image capture device, according to a first embodiment.

FIG. 1 is a functional block diagram of an image capture device 100, according to a first embodiment. The image capture device 100 includes an image capture unit 110, an image combining unit 130, a control unit 140, a storage unit 160, and a display unit 170.

Figure 2:
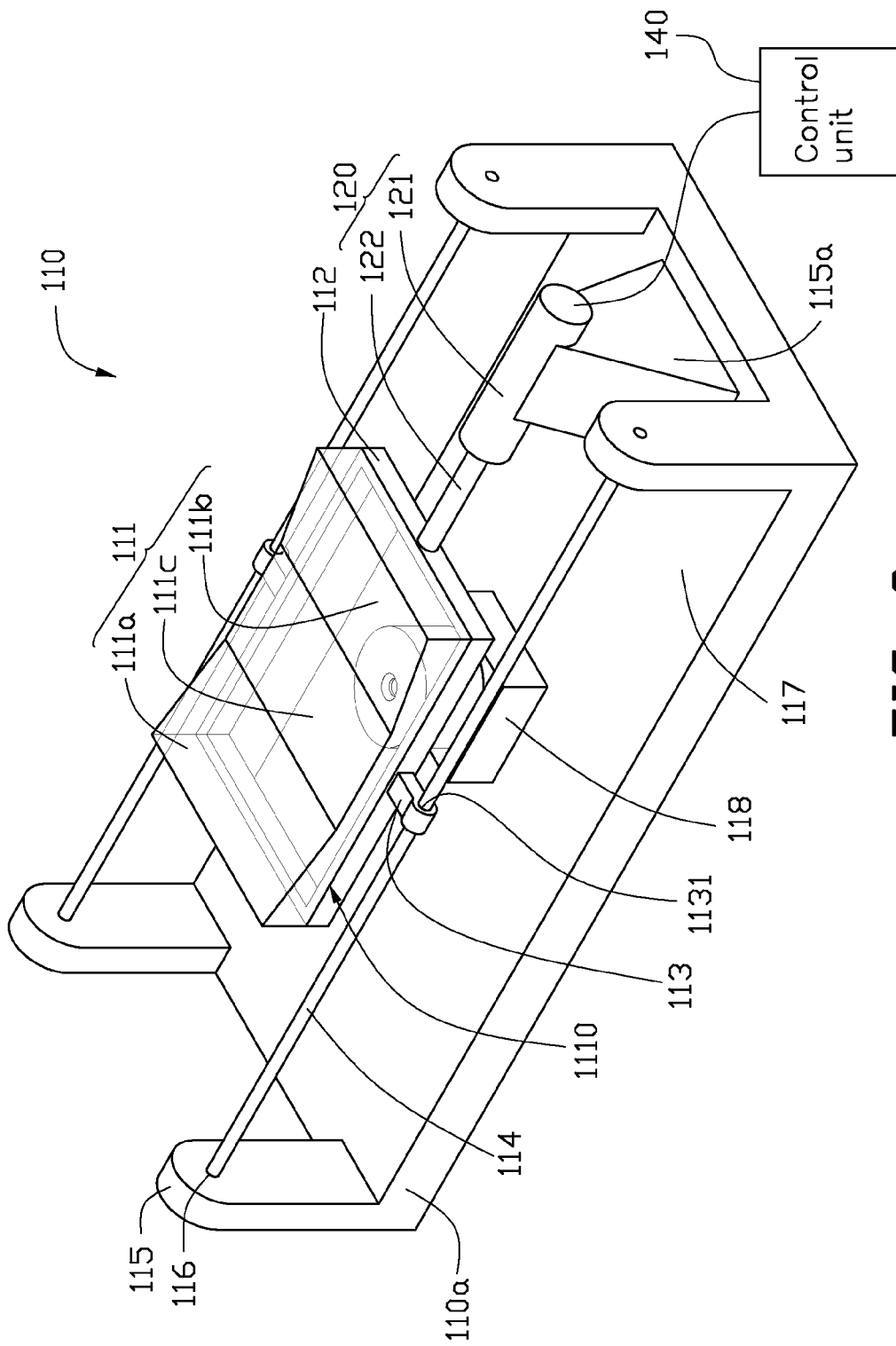
FIG. 2 is an isometric and schematic view of an image capture unit of FIG. 1.

The image capture unit 110 is configured for capturing images. Referring to FIG. 2, the image capture unit 110 includes a support 110a, a light guide plate 111, a frame 112, a camera module 118, and a driving unit 120. The camera module 118 has an optical axis L (see FIG. 3) associated therewith.

The support 110a includes a bottom plate 117, four supporting posts 115, a triangular-prism supporter 115a, and two guiding rods 114. The bottom plate 117 is rectangular. The four supporting posts 115 are positioned on four corners of the bottom plate 117, respectively. Four through holes 116 are defined at respective tops of the four supporting posts 115. Two opposite ends of the guiding rod 114 extend through two through holes 116 lengthwise along the side of the bottom plate 117. The guiding rod 114 is fixed to the two supporting posts 115 lengthwise along the side of the bottom plate 117. The triangular-prism supporter 115a is positioned on the bottom plate 117 between two positioning posts 115. The camera module 118 is positioned on the bottom plate 117 and faces the light guide plate 111. The camera module 118 is configured for capturing an image of an object.

The light guide plate 111 is positioned on the frame 112 and is transparent for transmitting light. The light guide plate 111 includes a first wedge-shaped portion 111a, a second wedge-shaped portion 111b, and an intermediate portion 111c connecting to the first wedge-shaped portion 111a and the second wedge-shaped portion 111b. The first and second wedge-shaped portions 111a, 111b are symmetrically arranged at opposite sides of the intermediate portion 111c. A thickness of the first wedge-shaped portion 111a increases in a direction away from the intermediate portion 111c. A thickness of the second wedge-shaped portion 111b increases in a direction away from the intermediate portion 111c. Bottom surfaces of the first and second wedge-shaped portions 111a, 111b and the intermediate portion 111c cooperatively form a bottom surface 1110 of the light guide plate 111. The bottom surface 1110 of the light guide plate 111 is a planar surface and faces the camera module 118 in this embodiment.

The frame 112 is slidably coupled to the guiding rods 114 with two guiding arms 113.

The driving unit 120 is positioned on the triangular-prism supporter 115a. In this embodiment, the driving unit 120 is configured for the light guide plate 111 to move along a direction substantially perpendicular to the optical axis L of the camera module 118. The driving unit 120 includes a body 121 and a driving rod 122. The driving rod 122 is retractably connected to the body 121. The body 121 is electrically connected to the control unit 140. The driving rod 122 is fixed to the frame 112 and drives the frame 112 and the light guide plate 111 to move along the guiding rods 114. The driving unit 120 may be a liner actuator, such as a piezoelectric driver comprised of $Pb(Zr,Ti)O_3$.

Figure 3:
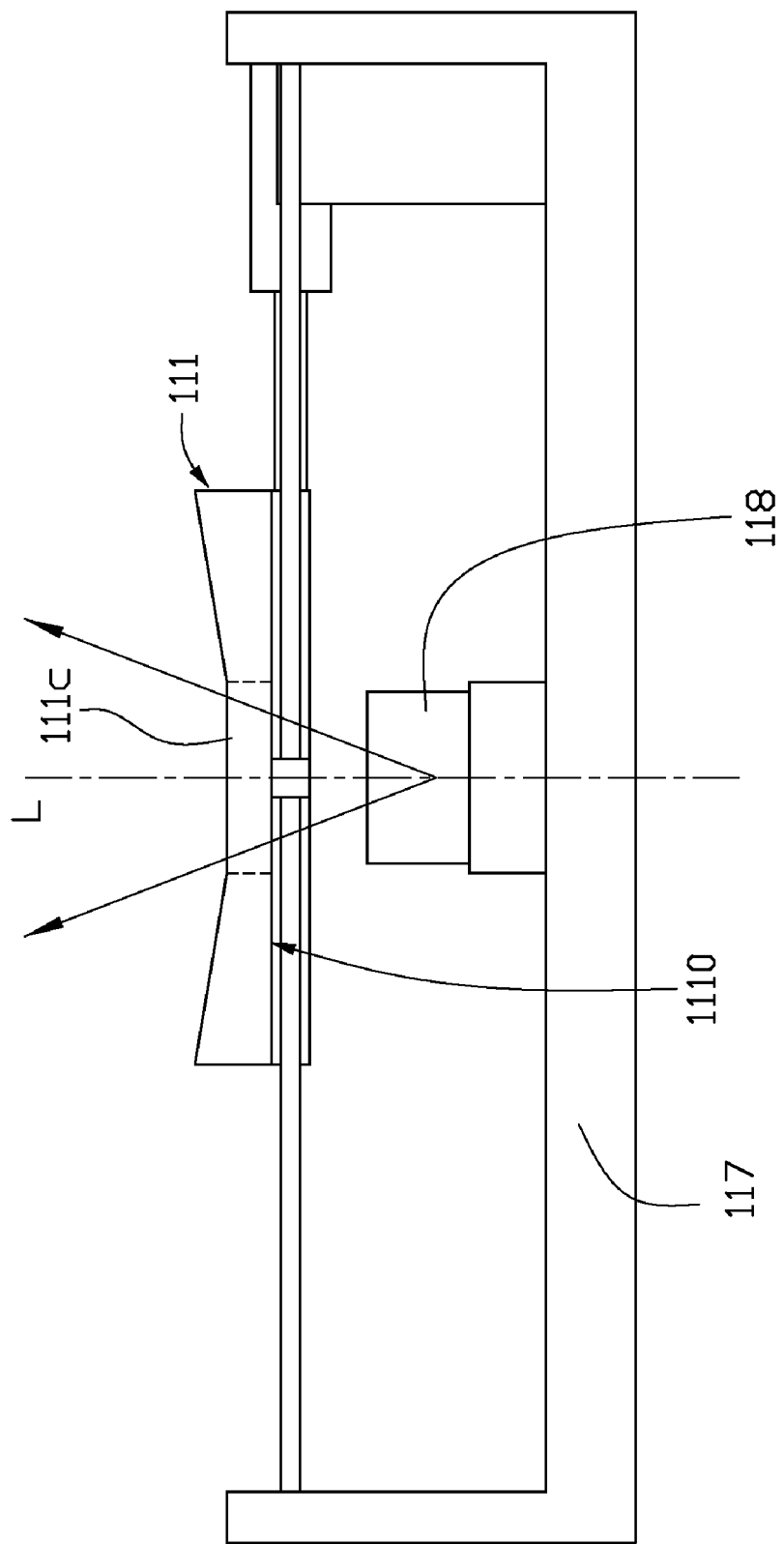
FIG. 3 is a side view of the image capture unit of FIG. 2 in a first operational state.
Figure 4:
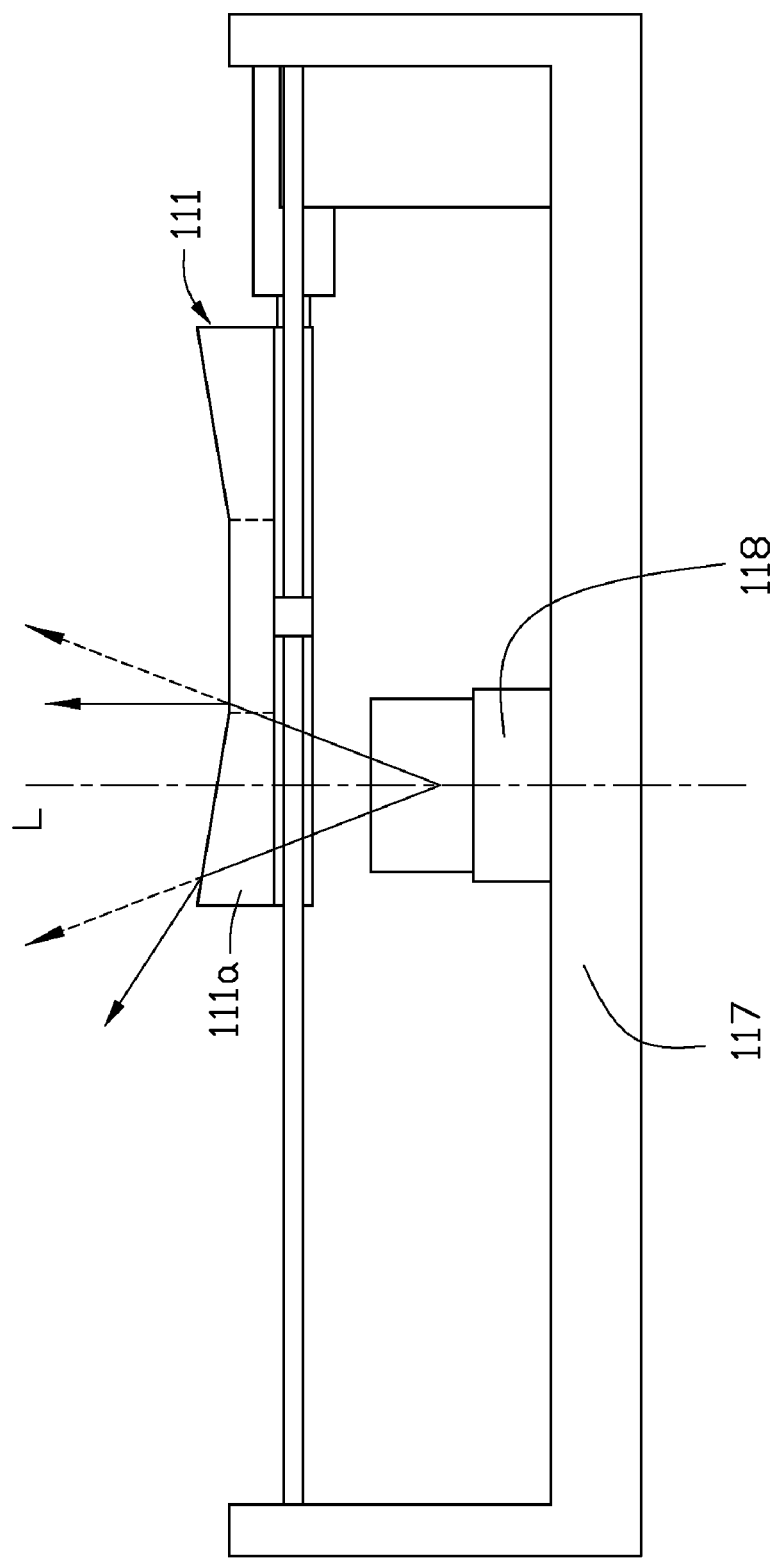
FIG. 4 is similar to FIG. 3, but showing the image capture unit in a second operational state.
Figure 5:
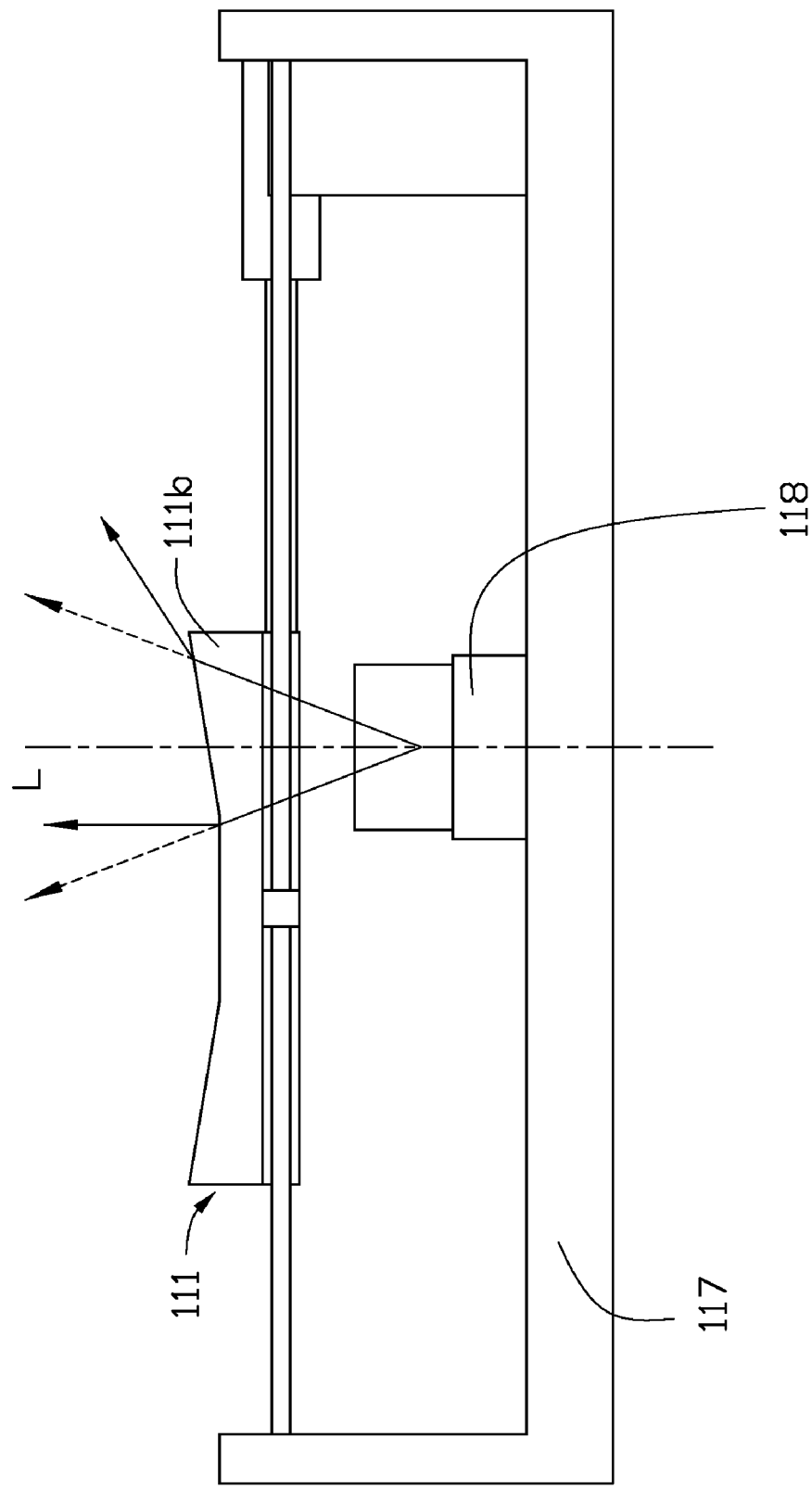
FIG. 5 is similar to FIG. 4, but showing the image capture unit in a third operational state.

Referring to FIGS. 3-5 (in FIGS. 3-5, solid lines with arrows represent an field of vision of the camera module 118, and dashed lines with arrows represent an imaginary field of vision of the camera module 118 without the refraction of the light guide plate 111), a linear movement of the light guide plate 111 is performed in three states: (1) the intermediate portion 111c of the light guide plate 111 is positioned above the top of the camera module 118 (as shown in FIG. 3) so that the camera module 118 is aligned with the intermediate portion 111c; (2) the first wedge-shaped portion 111a of the light guide plate 111 is positioned above the top of the camera module 118 (as shown in FIG. 4) so that the camera module 118 is aligned with the first wedge-shaped portion 111a and a field of vision of the camera module 118 is changed by refraction of the first wedge-shaped portion 111a; and (3) the second wedge-shaped portion 111b of the light guide plate 111 is positioned above top of the camera module 118 (as shown in FIG. 5) so that the camera module 118 is aligned with the second wedge-shaped portion 111b and the field of vision of the camera module 118 is changed by refraction of the second wedge-shaped portion 111b.

The control unit 140 controls the driving unit 120 driving the light guide plate 111 back and forth along the guiding rods 114 so that the image capture unit 110 can capture continuous images. For example, when the first wedge-shaped portion 111a is driven to position above/align with the camera module 118, the camera module 118 captures a first image upon completion of a first alignment; when the intermediate portion 111c is driven to position above/align with the camera module 118, the camera module 118 captures a second image upon completion of a second alignment; when the second wedge-shaped portion 111b is driven to position above/align with the camera module 118, the camera module 118 captures a third image upon completion of a third alignment.

The image combining unit 130 is configured for stitching the continuous images, such as the first, second, and third images, into a panoramic image.

The storage unit 160 stores the continuous images and the panoramic image. The display unit 170 displays the panoramic image.

It is noted that the disclosed image capture device 100 provides the movement of the light guide plate 111 relative to the camera module 118. Such a structure is compact and simple for any portable image capture device 100.

Figure 6:
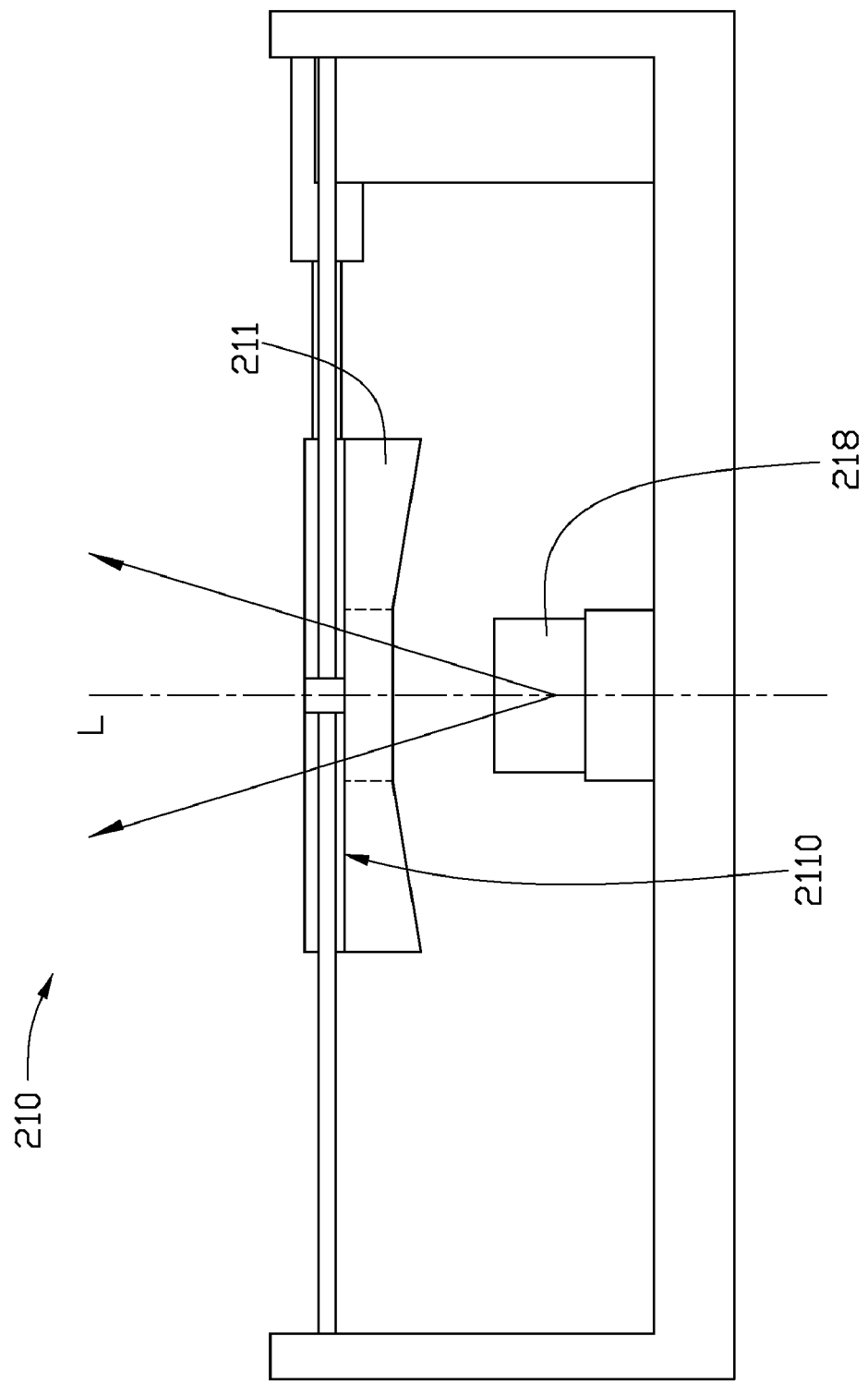
FIG. 6 is a side view of an image capture unit, according to a second embodiment, showing an image capturing unit in a first operational state.

Referring to FIG. 6, an image capture unit 210 of an image capture device, according to a second embodiment, is shown. The image capture unit 210 is different from the image capture unit 110 of the image capture device 100 of the first embodiment.

In the image capture unit 210, a planar surface 2110 of a light guide plate 211 faces away from a camera module 218.

Figure 7:
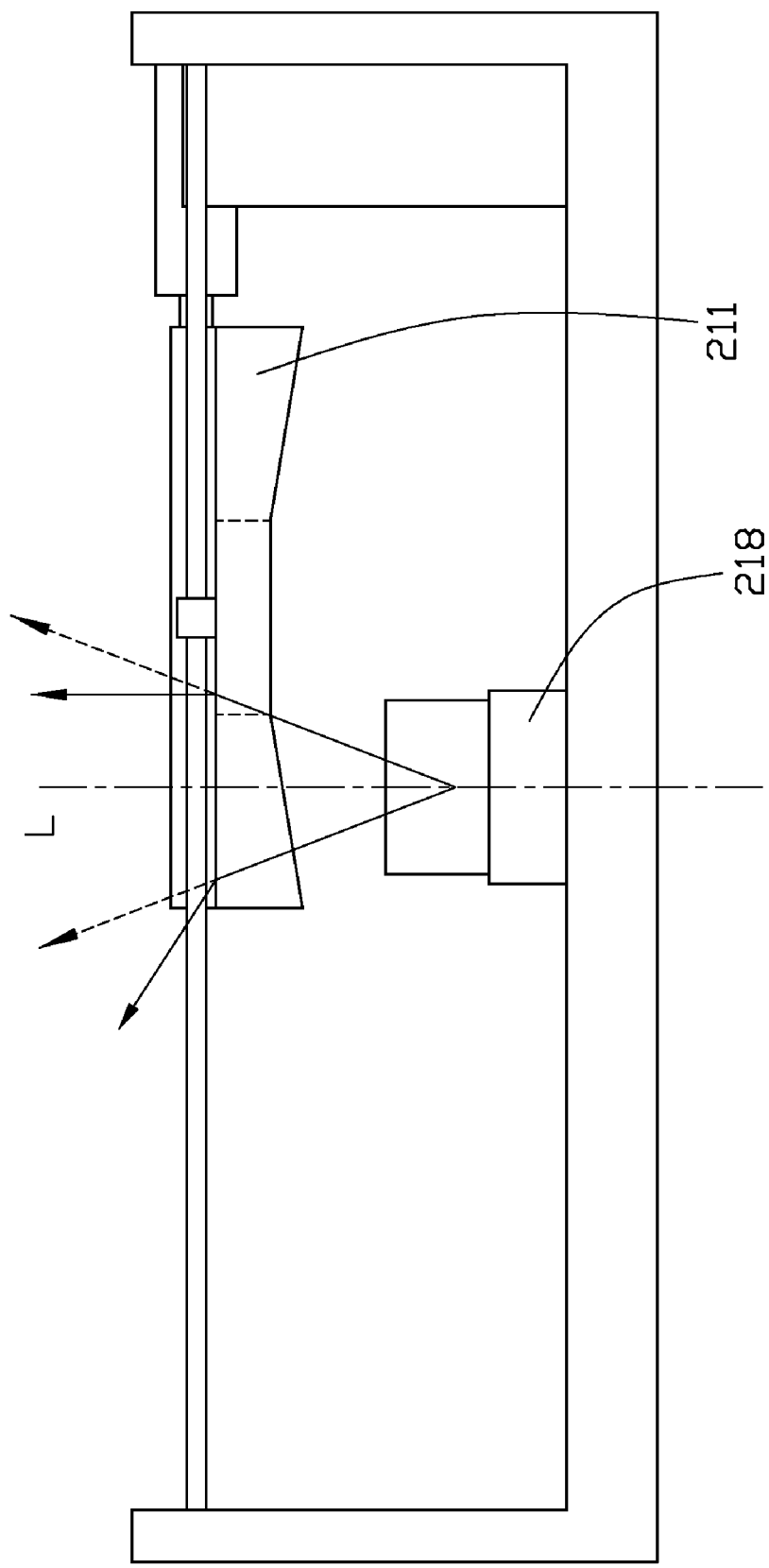
FIG. 7 is similar to FIG. 6, but showing the image capture unit in a second operational state.
Figure 8:
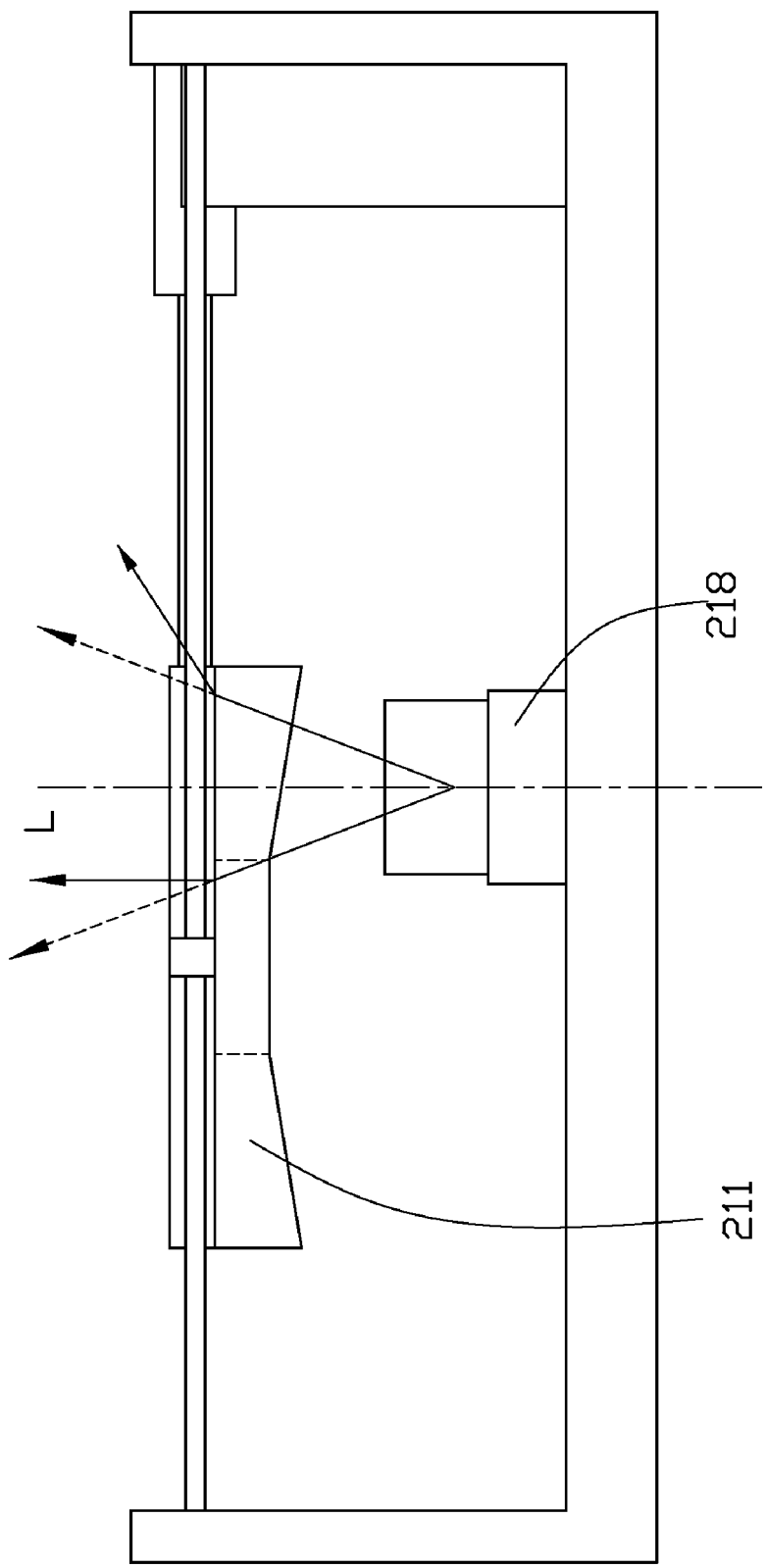
FIG. 8 is similar to FIG. 7, but showing the image capture unit in a third operational state.

Further referring to FIGS. 7-8, when in use, the light guide plate 211 is driven to different positions to selectively align the camera module 218 with the first wedge-shaped portion, the second wedge-shaped portion or the intermediate portion. Therefore, the camera module 218 captures images used to form the panoramic image. Working principles of the image capture device of this embodiment is the same as those of the image capture device 100 of the first embodiment.

Figure 9:
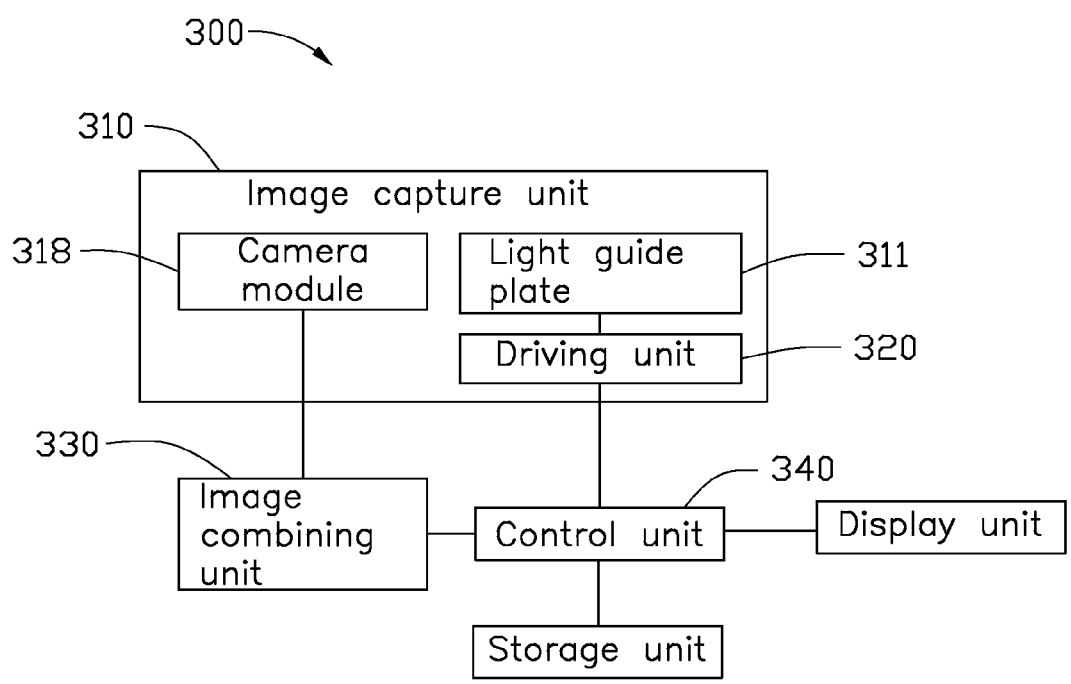
FIG. 9 is a functional block diagram of an image capture device, according to a third embodiment.
Figure 10:
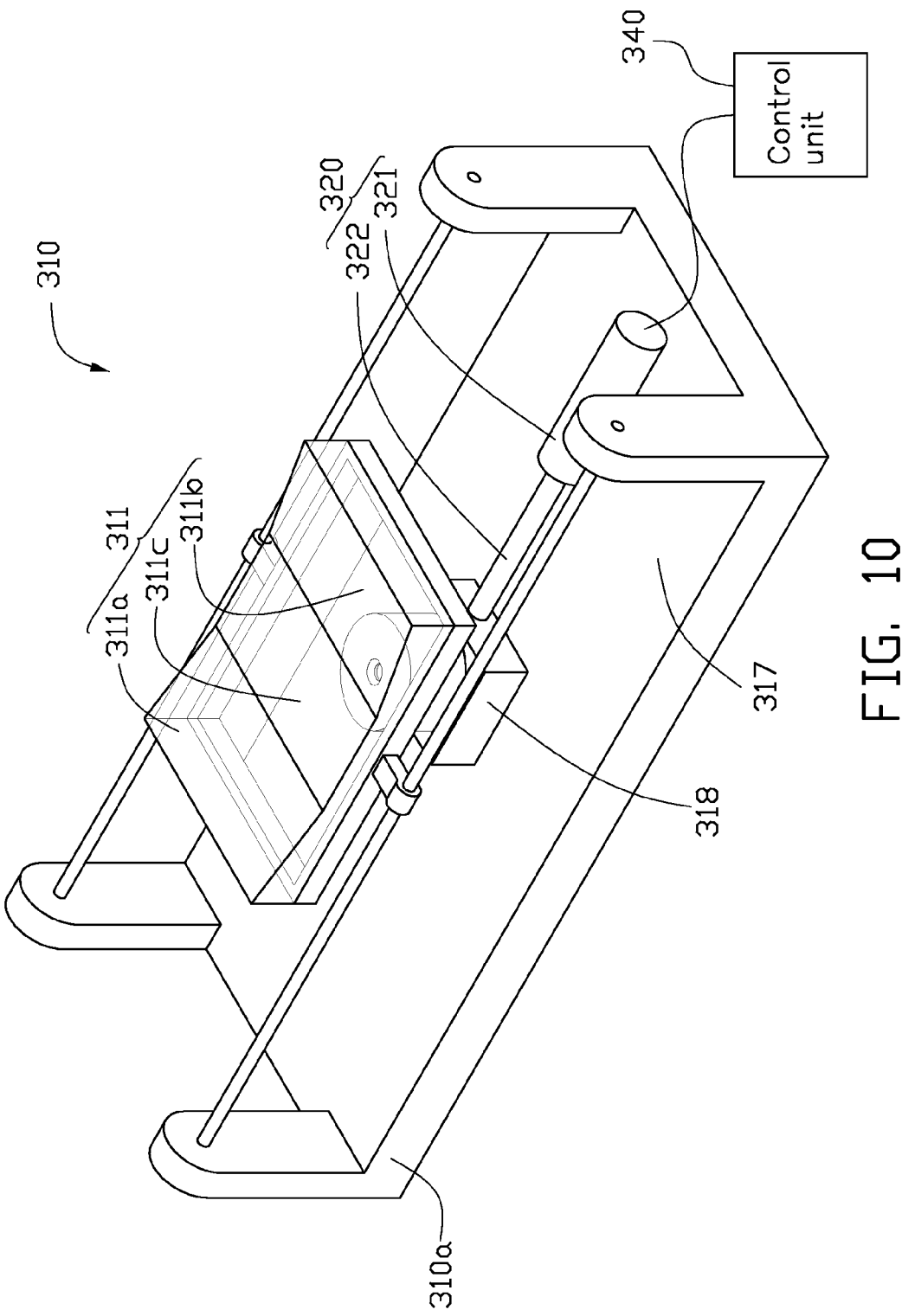
FIG. 10 is an isometric and schematic view of an image capture unit of FIG. 1.

Referring to FIGS. 9 and 10, an image capture device 300, according to a third embodiment, is shown. The differences between the image capture device 300 of this embodiment and the image capture device 100 of the first embodiment are that an image capture unit 310 and a control unit 340 are different.

In this embodiment, the image capture unit 310 includes a camera module 318 and a driving unit 320.

The camera module 318 is slidably positioned on a bottom plate 317 of a support 310a.

The driving unit 320 is configured for the camera module 318 to move relative to a light guide plate 311 along a direction substantially perpendicular to an optical axis of the camera module 318. The driving unit 320 includes a body 321 and a driving rod 322. The body 321 is fixedly positioned on the bottom plate 317. The driving rod 322 is retractably connected to the body 321. The body 321 is electrically connected to the control unit 340. The driving rod 322 is fixed to the camera module 318 and drives the camera module 318 to move along the driving rod 322.

The control unit 340 controls the driving unit 320 driving the camera module 318 back and forth along the driving rod 322 relative to the light guide plate 311 so that the image capture unit 310 can capture continuous images. For example, when the camera module 318 is driven to position above/align with a first wedge-shaped portion 311a of the light guide plate 311, the camera module 318 captures a first image upon completion of a first alignment; when the camera module 318 is driven to position above/align with an intermediate portion 311c of the light guide plate 311, the camera module 318 captures a second image upon completion of a second alignment; when the camera module 318 is driven to position above/align with a second wedge-shaped portion 311b of the light guide plate 311, the camera module 318 captures a third image upon completion of a third alignment.

An image combining unit 330 of the image capture device 300 is configured for stitching the continuous images, such as the first, second, and third images, into a panoramic image.

Advantages of the image capture device 300 of this embodiment are the same as those of the image capture device 100 of the first embodiment.

Figure 11:
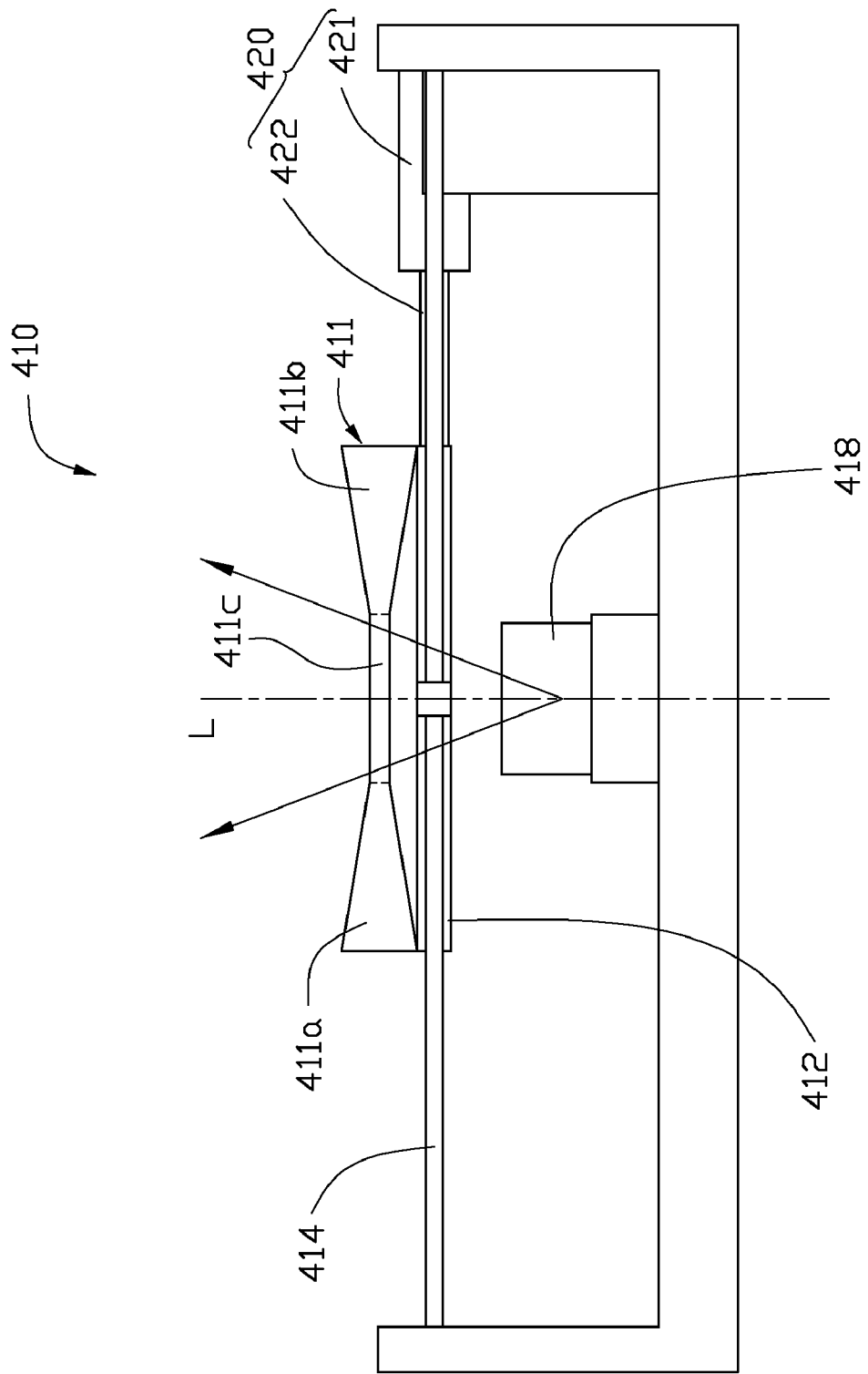
FIG. 11 is a side view of an image capture unit, according to a fourth embodiment.

Referring to FIG. 11, an image capture unit 410 of an image capture device, according to a fourth embodiment, is shown.

The image capture unit 410 includes a light guide plate 411, a driving unit 420 and a camera module 418. The camera module 418 has an optical axis L. The light guide plate 411 is bonded to a frame 412. The driving unit 420 includes a body 421 and a driving rod 422. The driving rod 422 is retractably connected to the body 421. The body 421 is electrically connected to a control unit (not shown). The driving rod 422 is fixed to the frame 412.

The light guide plate 411 includes a first wedge-shaped portion 411a, a second wedge-shaped portion 411b and an intermediate portion 411c. The driving unit 420 drives the light guide plate 411 to move along guiding rods 414 so that (1) the intermediate portion 411c of the light guide plate 411 is positioned above the top of the camera module 418 and the camera module 418 is aligned with the intermediate portion 411c; (2) the first wedge-shaped portion 411a of the light guide plate 411 is positioned above the top of the camera module 418 and the camera module 418 is aligned with the first wedge-shaped portion 411a and a field of vision of the camera module 418 is changed by refraction of the first wedge-shaped portion 411a; and (3) the second wedge-shaped portion 411b of the light guide plate 411 is positioned above top of the camera module 418 and the camera module 418 is aligned with the second wedge-shaped portion 411b and the field of vision of the camera module 418 is changed by refraction of the second wedge-shaped portion 411b.

Figure 12:
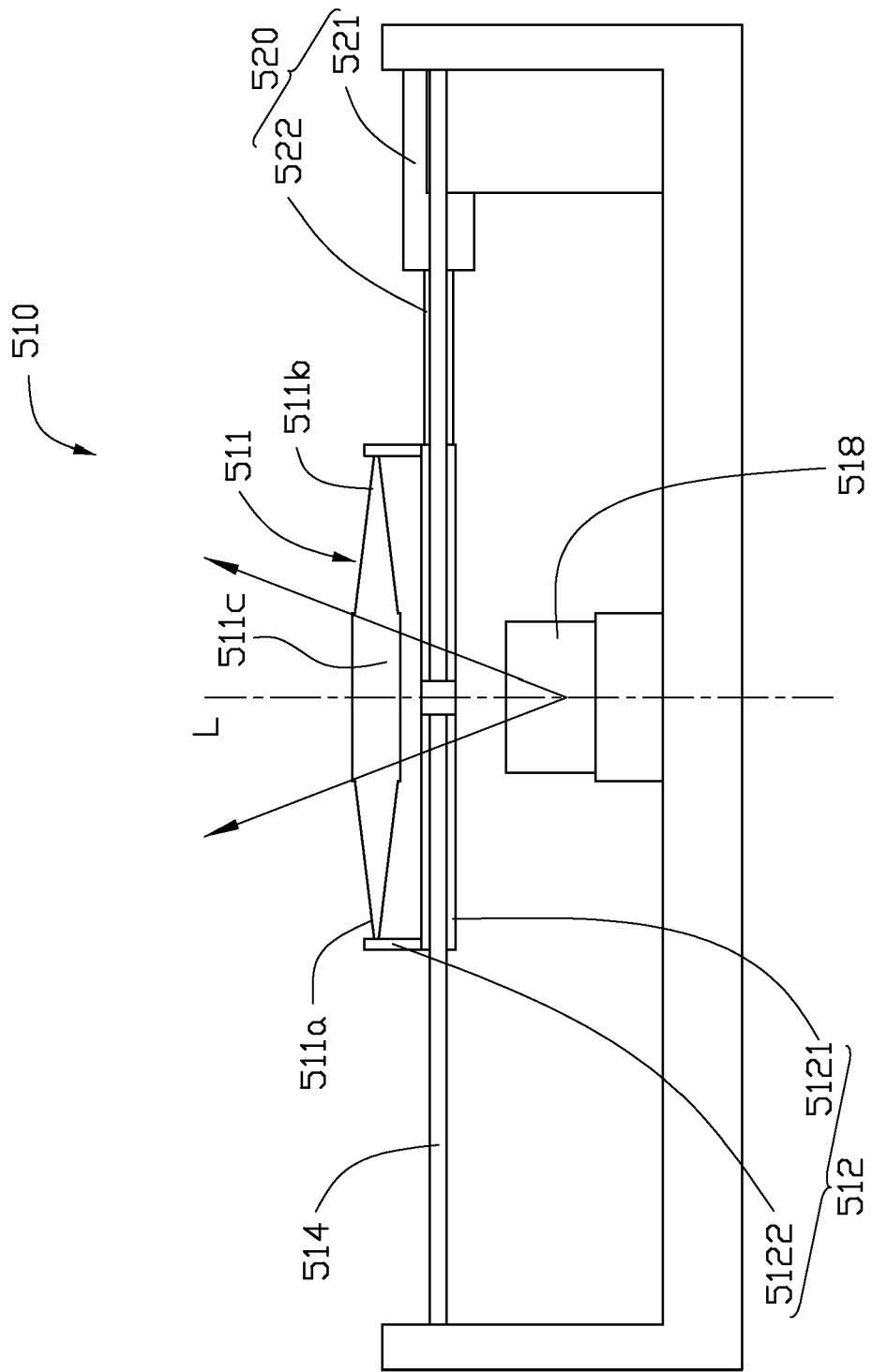
FIG. 12 is a side view of an image capture unit, according to a fifth embodiment.

Referring to FIG. 12, an image capture unit 410 of an image capture device, according to a fifth embodiment, is shown.

The image capture unit 510 includes a light guide plate 511, a driving unit 520 and a camera module 518. The camera module 518 has an optical axis L. The light guide plate 511 is bonded to a frame 512. Specifically, the frame 512 includes a main frame 5121 and two supporting arms 5122. The two support arms 5122 extends perpendicularly from two opposite sides of the main frame 5121. The light guide plate 511 is bonded to the supporting arms 5122.

The driving unit 520 includes a body 521 and a driving rod 522. The driving rod 522 is retractably connected to the body 521. The body 521 is electrically connected to a control unit (not shown). The driving rod 522 is fixed to the main frame 5121.

The light guide plate 511 includes a first wedge-shaped portion 511a, a second wedge-shaped portion 511b and an intermediate portion 511c. The driving unit 520 drives the light guide plate 511 to move along guiding rods 514 so that (1) the intermediate portion 511c of the light guide plate 511 is positioned above the top of the camera module 518 and the camera module 518 is aligned with the intermediate portion 511c; (2) the first wedge-shaped portion 511a of the light guide plate 511 is positioned above the top of the camera module 518 and the camera module 518 is aligned with the first wedge-shaped portion 511a and a field of vision of the camera module 518 is changed by refraction of the first wedge-shaped portion 511a; and (3) the second wedge-shaped portion 511b of the light guide plate 511 is positioned above top of the camera module 518 and the camera module 518 is aligned with the second wedge-shaped portion 511b and the field of vision of the camera module 518 is changed by refraction of the second wedge-shaped portion 511b.

Although other elements/components in the image capture units 410, 510 are not mentioned in the fourth and fifth embodiments, configurations of these other elements/components can be understood from the image capture units in the first to the third embodiments. Furthermore, it is to be understood that working principles of the image capture units 410, 510 of the fourth and fifth embodiments are the same as or similar to those image captured units in the first to third embodiments.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image capture unit, comprising:
    a light guide plate comprising a first wedge-shaped portion, a second wedge-shaped portion, and an intermediate portion connecting to the first wedge-shaped portion and the second wedge-shaped portion, the intermediate portion having a uniform thickness;
    a camera module facing the light guide plate, the camera module having an optical axis associated therewith; and
    a driving unit configured for driving the light guide plate or the camera module to move relative to the camera module or the light guide plate to selectively align the camera module with the first wedge-shaped portion, the second wedge-shaped portion, or the intermediate portion.

2. The image capture unit of claim 1, wherein a thickness of each of the first and second wedge-shaped portions increases in a direction away from the intermediate portion.

3. The image capture unit of claim 1, wherein the first and second wedge-shaped portions are symmetrically arranged at opposite sides of the intermediate portion.

4. The image capture unit of claim 3, wherein the driving unit is configured for driving the light guide plate to move along a direction substantially perpendicular to the optical axis.

5. The image capture unit of claim 3, wherein the driving unit is configured for driving the camera module to move along a direction substantially perpendicular to the optical axis.

6. The image capture unit of claim 1, wherein the driving unit is a piezoelectric driver comprised of $Pb(Zr,Ti)O_3$.

7. An image capture device, comprising:
    an image capture unit, comprising:
        a light guide plate comprising a first wedge-shaped portion, a second wedge-shaped portion, and an intermediate portion connecting to the first wedge-shaped portion and the second wedge-shaped portion, the intermediate portion having a uniform thickness;
        a camera module facing the light guide plate; and
        a driving unit configured for driving the light guide plate or the camera module to move relative to the camera module or the light guide plate to selectively align the camera module with the first wedge-shaped portion, the second wedge-shaped portion, or the intermediate portion, and captures an image upon completion of each alignment;
        a control unit configured for controlling the driving unit to driving the light guide plate or the camera module to move; and
    an image combining unit configured for stitching the images into a panoramic image.

8. The image capture device of claim 7, wherein a thickness of each of the first and second wedge-shaped portions increases in a direction away from the intermediate portion.

9. The image capture device of claim 7, wherein the first and second wedge-shaped portions are symmetrically arranged at opposite sides of the intermediate portion.

10. The image capture device of claim 9, wherein the driving unit is configured for driving the light guide plate to move along a direction substantially perpendicular to the optical axis.

11. The image capture device of claim 9, wherein the driving unit is configured for driving the camera module to move along a direction substantially perpendicular to the optical axis.

12. The image capture device of claim 7, wherein the driving unit is a piezoelectric driver comprised of $Pb(Zr,Ti)O_3$.

13. An image capture device, comprising:
    a light guide plate comprising a first wedge-shaped portion, a second wedge-shaped portion, and a plate portion having a uniform thickness;
    a camera module facing the light guide plate; and
    a driving unit configured for driving one of the light guide plate or the camera module to move relative to the other to enable the camera module to align with the first wedge-shaped portion, the plate portion and the second wedge-shaped portion and capture an image upon completion of each alignment; and
    an image combining unit configured for stitching the images into a panoramic image.

* * * * *